(12) United States Patent
Usami

(10) Patent No.: US 9,825,552 B1
(45) Date of Patent: Nov. 21, 2017

(54) POWER CONVERSION APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yutaka Usami, Izunokuni Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/263,500

(22) Filed: Sep. 13, 2016

(51) Int. Cl.
H02M 1/12 (2006.01)
H02M 7/06 (2006.01)
H02M 1/42 (2007.01)

(52) U.S. Cl.
CPC ............... *H02M 7/06* (2013.01); *H02M 1/12* (2013.01); *H02M 1/42* (2013.01)

(58) Field of Classification Search
CPC ............ H02M 1/12; H02M 1/14; H02M 1/15; H02M 1/126; H02M 1/4208; H02M 7/00; H02M 7/217
USPC ..... 363/39, 44, 45, 46, 47, 81, 84, 125, 126
See application file for complete search history.

(56) References Cited

U.S. PATENT DOCUMENTS

| 5,410,466 A * | 4/1995 | Maehara | H02M 1/425 315/224 |
|---|---|---|---|
| 5,519,306 A * | 5/1996 | Itoh | H02M 1/4208 323/207 |
| 5,572,417 A * | 11/1996 | Vinciarelli | H02M 7/217 323/222 |
| 6,498,463 B2 * | 12/2002 | Chang | H02M 1/34 323/222 |
| 9,647,534 B2 * | 5/2017 | Usami | H02M 1/4258 |
| 2003/0043607 A1 * | 3/2003 | Vinciarelli | H02M 1/4208 363/61 |
| 2008/0025052 A1 * | 1/2008 | Yasumura | H02M 1/4241 363/21.04 |
| 2008/0101099 A1 * | 5/2008 | Jacobs | H02M 7/06 363/47 |
| 2010/0296324 A1 * | 11/2010 | Boeke | H02M 3/1582 363/127 |

(Continued)

FOREIGN PATENT DOCUMENTS

| JP | 07-203681 | 8/1995 |
|---|---|---|
| JP | 2012-085389 | 4/2012 |

*Primary Examiner* — Adolf Berhane
(74) *Attorney, Agent, or Firm* — Amin, Turocy & Watson LLP

(57) ABSTRACT

A power conversion apparatus sets a point between AC input terminals of a full-wave rectifying circuit as an input terminal of an alternating voltage, connects a series circuit of two capacitors between the input terminals, connects a series circuit of two switches between DC output terminals of the full-wave rectifying circuit, connects one end of a series circuit of a third capacitor and an inductor with a midpoint of the two switches, connects the other end thereof with a connection point of two capacitors, connects a positive electrode side terminal of a smoothing capacitor with a DC output terminal of a positive electrode of the full-wave rectifying circuit via a first diode, connects a negative electrode side terminal of the smoothing capacitor with a DC output terminal of a negative electrode of the full-wave rectifying circuit via a second diode for preventing counter current.

20 Claims, 11 Drawing Sheets

(56) References Cited

U.S. PATENT DOCUMENTS

| | | | | |
|---|---|---|---|---|
| 2012/0092909 A1* | 4/2012 | Usami | ............... | H02M 7/217 |
| | | | | 363/80 |
| 2012/0099356 A1* | 4/2012 | Usami | ............... | H02M 7/219 |
| | | | | 363/126 |
| 2013/0070500 A1* | 3/2013 | Usami | ............. | H02M 7/12 |
| | | | | 363/126 |
| 2013/0308358 A1* | 11/2013 | Usami | ............. | H02M 7/04 |
| | | | | 363/84 |
| 2016/0036319 A1* | 2/2016 | Katsumata | .......... | H02M 1/14 |
| | | | | 363/126 |

\* cited by examiner

POWER CONVERSION APPARATUS

FIELD

Embodiments described herein relate generally to a power conversion apparatus that converts an alternating voltage obtained from an alternating voltage power supply to a direct voltage for supplying power to a load.

BACKGROUND

In general, a PFC (Phase Factor Collection) circuit is incorporated into a circuit which converts an alternating voltage to a direct voltage. The PFC circuit which is a circuit for making an input current into a sine wave can suppress harmonic characteristics of the input current.

The PFC circuit is composed of four components including an inductor, a switch element, a diode and a smoothing capacitor. In the PFC circuit, if the switch element is turned on, a current flows to the inductor and magnetic energy is stored in the inductor. Next, if the switch element is turned off, the magnetic energy stored in the inductor is converted to electrical energy. Then, through the electrical energy, an electric charge is stored in the smoothing capacitor, and a voltage of the smoothing capacitor rises due to an increase in the electric charge.

However, in the PFC circuit, when the switch element is switched from the off state to the on state, a reverse current instantly flows to the diode through a parasitic capacitance component of the diode. Then, power loss occurs due to a product of the reverse current and a voltage generated at both ends of the switch element. Thus, if the PFC circuit is incorporated into the circuit which converts the alternating voltage to the direct voltage, there is a problem that power conversion efficiency deteriorates.

Thus, a power conversion apparatus which has the same phase factor improvement capacity as the PFC circuit and does not deteriorate the power conversion efficiency is required.

DETAILED DESCRIPTION

In an embodiment, described herein is a power conversion apparatus containing a power conversion circuit configured to set a point between AC input terminals of a full-wave rectifying circuit as an input terminal of an alternating voltage, connect a series circuit of a first capacitor and a second capacitor between input terminals of the alternating voltage, connect a series circuit of a first switch and a second switch between DC output terminals of the full-wave rectifying circuit, connect one end of a series circuit of a third capacitor and an inductor with a midpoint of the first switch and the second switch, connect the other end of the series circuit of the third capacitor and the inductor with a connection point of the first capacitor and the second capacitor, connect a positive electrode side terminal of a smoothing capacitor with a DC output terminal of a positive electrode of the full-wave rectifying circuit via a first diode for guiding a reverse current flowing through the second switch to the smoothing capacitor side and preventing a forward current flowing through the second switch from the smoothing capacitor side, connect a negative electrode side terminal of the smoothing capacitor with a DC output terminal of a negative electrode of the full-wave rectifying circuit via a second diode for preventing counter current, and set both ends of the smoothing capacitor as output terminals of direct voltages; and a controller configured to set a high switching frequency when an average voltage per unit time of the direct voltages output from the output terminal is larger than a reference voltage and set a low switching frequency when the average voltage is smaller than the reference voltage to exclusively output switching signals of the switching frequencies to the first switch and the second switch.

In another embodiment, described herein is a power conversion method involving increasing a switching frequency when an average voltage per unit time of the direct voltages output from the output terminal is larger than a reference voltage; and decreasing the switching frequency when the average voltage is smaller than the reference voltage to exclusively output switching signals of the switching frequencies to the first switch and the second switch.

Hereinafter, an embodiment of a power conversion apparatus which has the same phase factor improvement capacity as a PFC circuit and does not deteriorate power conversion efficiency is described with reference to the accompanying drawings.

First Embodiment

Firstly, the first embodiment of a power conversion apparatus 10 is described.

Figure 1:
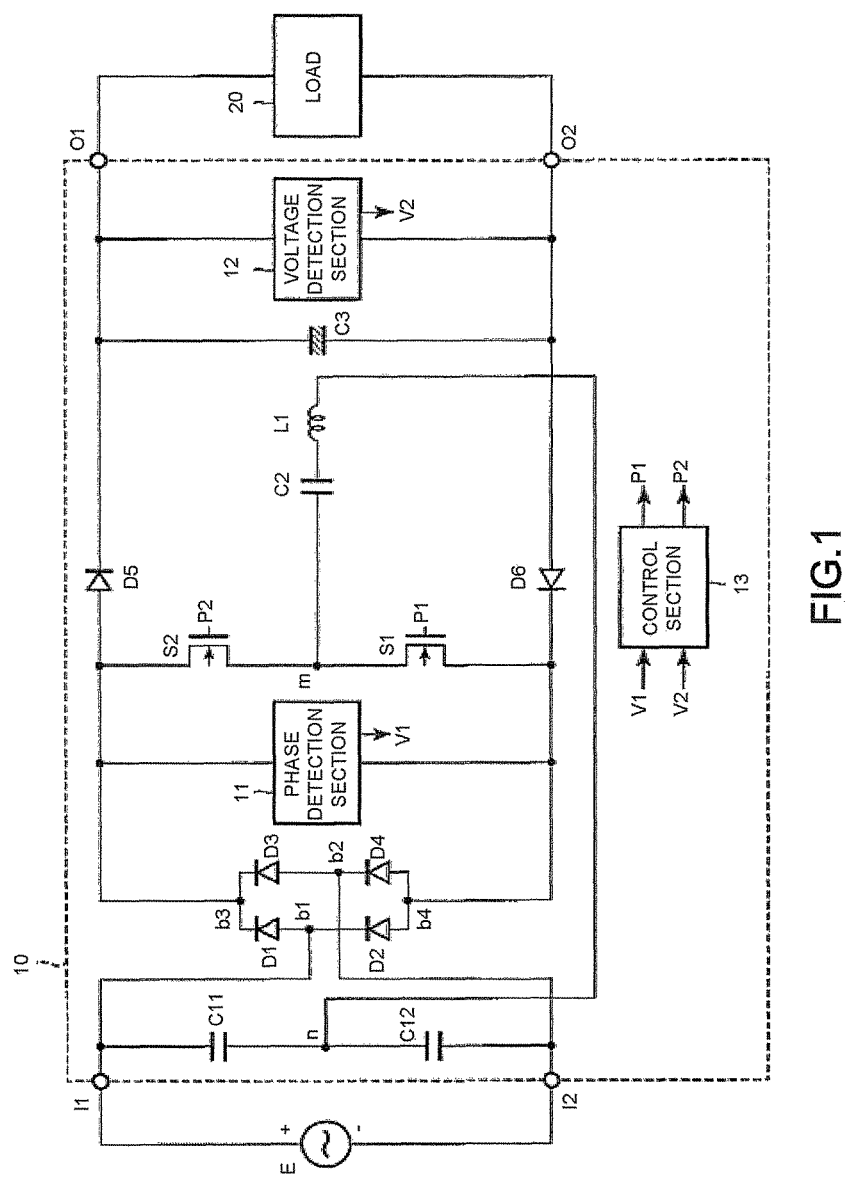
FIG. 1 is a circuit diagram illustrating a power conversion apparatus according to a first embodiment.

FIG. 1 is a circuit diagram illustrating the power conversion apparatus 10. The power conversion apparatus 10 includes a first to a third capacitors C11, C12 and C2, a smoothing capacitor C3, diode bridge circuits D1, D2, D3 and D4, a first switch S1, a second switch S2, an inductor L1 and a first and a second diodes D5 and D6 for preventing counter current.

The first and second switches S1 and S2 are semiconductor switches composed of an N-type MOSFET (Metal-Oxide-Semiconductor Field-Effect Transistor). In this kind of semiconductor switch, a positive current flows to a direction of a source terminal from a drain terminal. An on state or an off state of the positive current is controlled by a signal applied to a gate terminal. Further, in the semiconductor switch, if a reverse voltage is applied from the source terminal to the drain terminal, a current flows via a body diode. The current flows even if the signal applied to the gate terminal is an OFF state.

Diode bridge circuits D1~D4 are full-wave rectifying circuits for full-wave rectifying an alternating current from an alternating voltage power supply E. The diode bridge circuits D1~D4 connect the cathode of the diode D2 with the anode of the diode D1, and the cathode of the diode D4 with the anode of the diode D3. Furthermore, the diode bridge circuits D1~D4 connect the anode of the diode D2 with that of the diode D4, and the cathode of the diode D1 with that of the diode D3. Through such the connection, a connection point b1 of the diode D2 and the diode D1 and a connection point b2 of the diode D4 and the diode D3 function as AC input terminals. Further, a connection point b3 of the diode D1 and the diode D3 functions as a DC output terminal of a positive electrode, and a connection point b4 of the diode D2 and the diode D4 functions as a DC output terminal of a negative electrode.

The power conversion apparatus 10 is equipped with a pair of circuit input terminals I1 and I2 and a pair of circuit output terminals O1 and O2. The power conversion apparatus 10 connects the alternating voltage power supply E between the circuit input terminals I1 and I2, and a load 20 between the circuit output terminals O1 and O2. The alternating voltage power supply E defines the upper side as a negative electrode (+) terminal and the lower side as a positive electrode (−) terminal in FIG. 1. The load 20 may be a pure load, for example, a heater composed of a resistance component R, or a complex circuit load, for example, a DC-DC converter connected to the rear stage.

The power conversion apparatus 10 connects one end of the capacitor C11 serving as the first capacitor with the circuit input terminal I1, the other end of the capacitor C11 with one end of the capacitor C12 serving as the second capacitor, and the circuit input terminal I2 with the other end of the capacitor C12. The power conversion apparatus 10 connects a series circuit of the capacitors C11 and C12 between the circuit input terminals I1 and I2. Further, the power conversion apparatus 10 connects one AC input terminal b1 of the diode bridge circuits D1~D4 with a connection point of the circuit input terminal I1 and the capacitor C11, and the other AC input terminal b2 of the diode bridge circuits D1~D4 with a connection point of the other circuit input terminal I2 and the capacitor C12.

The power conversion apparatus 10 connects a series circuit of the switches S1 and S2 between the DC output terminals b3 and b4 of the diode bridge circuits D1~D4. Specifically, the power conversion apparatus 10 connects the drain terminal of the switch S2 with the DC output terminal b3 of the positive electrode of the diode bridge circuits D1~D4, and the source terminal of the switch S2 with the drain terminal of the switch S1. Furthermore, the power conversion apparatus 10 connects the source terminal of the switch S1 with the DC output terminal b4 of the negative electrode of the diode bridge circuits D1~D4.

The power conversion apparatus 10 connects a series circuit of the capacitor C2 serving as the third capacitor and the inductor L1 with a midpoint m serving as a connection point of the source terminal of the switch S2 and the drain terminal of the switch S1. Specifically, the power conversion apparatus 10 connects one end of the capacitor C2 with the midpoint m, and the other end of the capacitor C2 with one end of the inductor L1. Furthermore, the power conversion apparatus 10 connects the other end of the inductor L1 with a connection point n of the capacitor C11 and the capacitor C12.

The power conversion apparatus 10 connects the anode of the diode D5 serving as the first diode with a connection point of the DC output terminal b3 of the positive electrode of the diode bridge circuits D1~D4 and the drain terminal of the switch S2, and the cathode of the diode D5 with a positive electrode side terminal of the smoothing capacitor C3. Furthermore, the power conversion apparatus 10 connects the anode of the diode D6 serving as the second diode with the negative electrode side terminal of the smoothing capacitor C3 and the cathode of the diode D6 with a connection point of the DC output terminal b4 of the negative electrode of the diode bridge circuits D1~D4 and the source terminal of the switch S1.

The power conversion apparatus 10 connects both terminals of the smoothing capacitor C3 with a pair of the circuit output terminals O1 and O2. Specifically, the power conversion apparatus 10 connects a connection point of the diode D5 and the positive electrode side terminal of the smoothing capacitor C3 with one circuit output terminal O1, and a connection point of the negative electrode side terminal of the smoothing capacitor C3 and the capacitor C6 with the other circuit output terminal O2.

The power conversion apparatus 10 is equipped with a phase detector or phase detection section 11, a voltage detector or voltage detection section 12 and a controller or control section 13.

The phase detection section 11 is connected between the DC output terminals b3 and b4 of the diode bridge circuits D1~D4. The phase detection section 11 detects a phase of an alternating voltage applied to the diode bridge circuits D1~D4. Then, the phase detection section 11 outputs a phase detection signal V1 to the control section 13.

The voltage detection section 12 is connected between the both terminals of the smoothing capacitor C3. The voltage detection section 12 detects a voltage generated between the both terminals of the smoothing capacitor C3. Then, the detection section 12 outputs a voltage detection signal V2 to the control section 13.

The control section 13 sets the phase detection signal V1 and the voltage detection signal V2 as input, and generates gate pulse signals P1 and P2 serving as switching signals of the switches S1 and S2. Then, the control section 13 respectively outputs the gate pulse signals P1 and P2 to the gate terminals of the switches S1 and S2.

Figure 2:
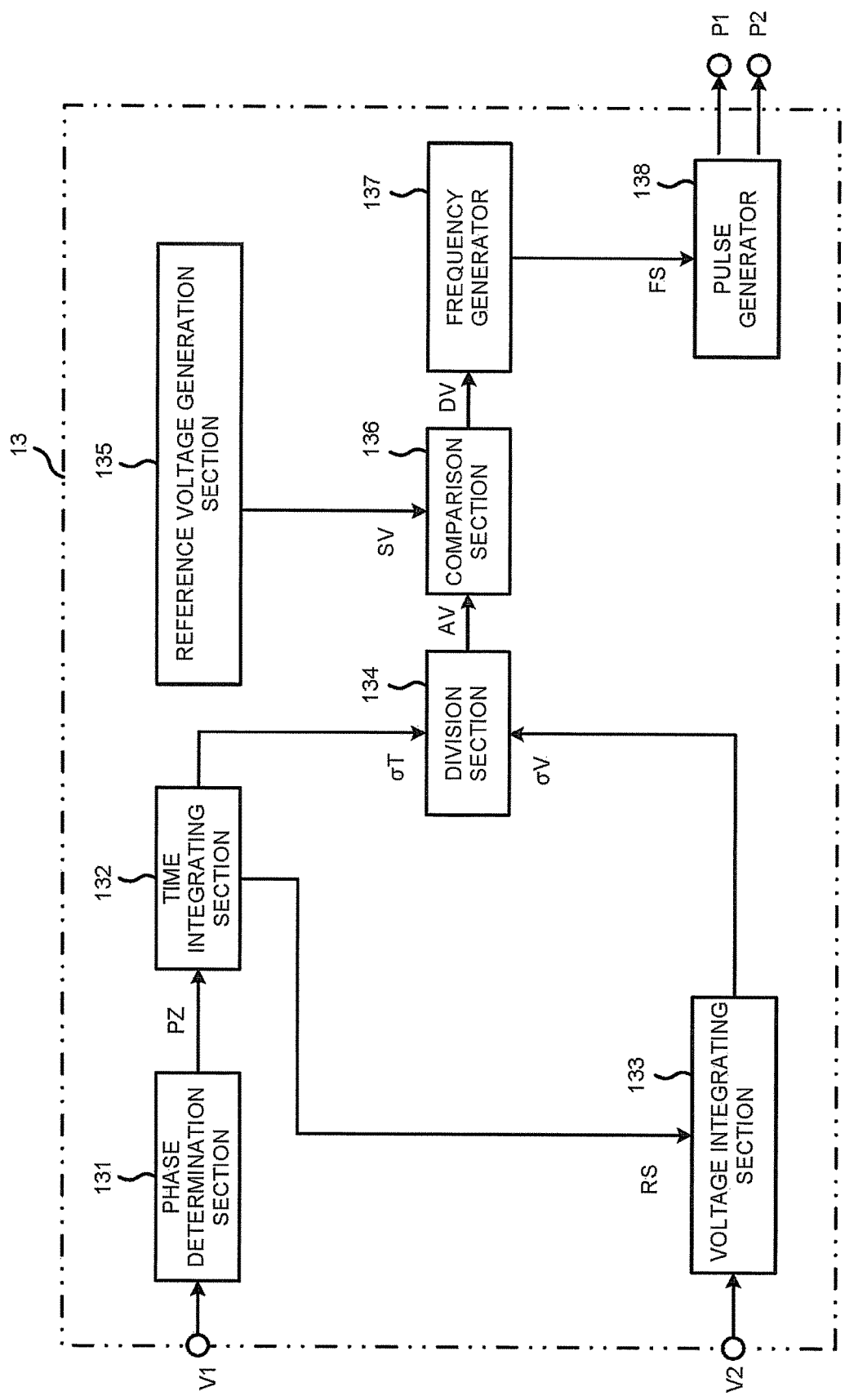
FIG. 2 is a block diagram illustrating the internal configuration of a control section according to the first embodiment.

FIG. 2 is a block diagram illustrating the internal configuration of the control section 13. The control section 13 includes a phase determination section 131, a time integrating section 132, a voltage integrating section 133, a division section 134, a reference voltage generation section 135, a comparison section 136, a frequency generator 137 and a pulse generator 138.

The phase determination section 131 inputs the phase detection signal V1 output from the phase detection section 11. The phase determination section 131 determines a point at which a phase angle is zero degree from the phase detection signal V1. For example, if a frequency of the alternating voltage power supply E is 50 Hz, a frequency of a pulsating current full-wave rectified by the diode bridge circuits D1~D4 becomes 100 Hz. The phase determination section 131 determines a point at which the phase angle of the frequency 100 Hz is zero degree, that is, a phase zero point. The phase determination section 131 outputs a zero point determination signal PZ to the time integrating section 132 each time the phase zero point is determined.

In a case of realizing the function of the phase determination section 131 with an analog circuit, a PLL (Phase Locked Loop) circuit may be used. In a case of realizing the function of the phase determination section 131 with a digital circuit, the voltage is sampled at a certain interval, and a circuit which tries to find out periodicity in time series may be constituted.

The time integrating section 132 inputs the zero point determination signal PZ output from the phase determination section 131. The time integrating section 132 integrates time from a moment one zero point determination signal PZ is input to a moment the next zero point determination signal PZ is input. In other words, the time integrating section 132 calculates time needed from one phase zero point of the frequency of the pulsating current to the next phase zero point thereof. For example, if the frequency of the pulsating current is 100 Hz, the time is 10 ms. The time integrating section 132 outputs integrated time σT till then to the division section 134 each time the zero point determination signal PZ is input. Further, the time integrating section 132 outputs a reset signal RS to the voltage integrating section 133 each time the zero point determination signal PZ is input.

In a case of realizing the function of the time integrating section 132 with the analog circuit, a circuit which can replace the integrated value of the time with voltage rise by a CR time constant may be used. In a case of realizing the function of the time integrating section 132 with the digital circuit, a circuit which calculates the time by counting it backward from a sampling number and a sampling interval may be constituted.

The voltage integrating section 133 inputs the voltage detection signal V2 output from the voltage detection section 12 and the reset signal RS output from the time integrating section 132. The voltage integrating section 133 integrates voltages obtained from the voltage detection signal V2 during a period from a moment one reset signal RS is input to a moment the next reset signal RS is input. Then, the voltage integrating section 133 outputs an integrated voltage σV till then to the division section 134 and meanwhile resets the integrated voltage σV each time the reset signal RS is input.

In a case of realizing the function of the voltage integrating section 133 with the analog circuit, a circuit which can replace the integrated value of the voltage with the voltage rise by the CR time constant may be used. In a case of realizing the function of the voltage integrating section 133 with the digital circuit, a circuit which samples the voltage detection signal V2 and only adds the sampled voltage detection signals V2 may be constituted.

The division section 134 inputs the integrated time σT output from the time integrating section 132 and the integrated voltage σV output from the voltage integrating section 133. The division section 134 divides the integrated voltage σV by the integrated time σT input at the same timing. In other words, the division section 134 calculates an average voltage AV of the voltages detected by the voltage detection section 12 in the time needed from one phase zero point of the frequency of the pulsating current to the next the phase zero point. Then, the division section 134 outputs the average voltage AV to the comparison section 136.

In a case of realizing the function of the division section 134 with the analog circuit, an analog divider may be used.

In a case of realizing the function of the division section 134 with the digital circuit, an arithmetical divider may be constituted.

The reference voltage generation section 135 is boosted by the power conversion apparatus 10 to generate a reference voltage SV of a direct voltage output to the load 20. The reference voltage SV is set in advance. The reference voltage generation section 135 outputs the reference voltage to the comparison section 136.

In a case of realizing the function of the reference voltage generation section 135 with the analog circuit, a Zener voltage circuit or a variable three-terminal power supply may be used. In a case of realizing the function of the reference voltage generation section 135 with the digital circuit, a register circuit for storing the reference voltage may be used.

The comparison section 136 inputs the average voltage AV output from the division section 134 and the reference voltage SV output from the reference voltage generation section 135. The comparison section 136 compares the average voltage AV with the reference voltage SV to calculate a difference voltage DV (=average voltage AV-reference voltage SV). Then, the comparison section 136 outputs the difference voltage DV to the frequency generator 137.

In a case of realizing the function of the comparison section 136 with the analog circuit, a differential amplifier circuit which uses an operational amplifier may be used. In a case of realizing the function of the comparison section 136 with the digital circuit, a comparison circuit with an arithmetical subtractor may be constituted.

The frequency generator 137 inputs the difference voltage DV output from the comparison section 136. When the difference voltage DV is positive, in other words, there is a relation of "average voltage AV>reference voltage SV", the frequency generator 137 functions in such a way as to increase a frequency of a frequency variable signal FS. When the difference voltage DV is negative, in other words, there is a relation of "average voltage AV<reference voltage SV", the frequency generator 137 functions in such a way as to decrease the frequency of the frequency variable signal FS. The frequency generator 137 outputs the frequency variable signal FS to the pulse generator 138.

In a case of realizing the function of the frequency generator 137 with the analog circuit, a triangular wave generator of variable frequency may be used. In a case of realizing the function of the frequency generator 137 with the digital circuit, a circuit which changes a count value for generating a cycle may be constituted.

The pulse generator 138 inputs the frequency variable signal FS output from the frequency generator 137. The pulse generator 138 exclusively generates the gate pulse signals P1 and P2 in synchronization with the frequency of the frequency variable signal FS. Then, the pulse generator 138 outputs the gate pulse signal P1 to the gate terminal of the switch S1 as a switching signal to the switch S1. Further, the pulse generator 138 outputs the gate pulse signal P2 to the gate terminal of the switch S2 as a switching signal to the switch S2. The gate pulse signal P1 and the gate pulse signal P2 are not used to turn on the switches at the same time. In this way, the switches S1 and S2 are exclusively turned on and off. Frequencies of the gate pulse signals P1 and P2 are changed in synchronization with the frequency of the frequency variable signal FS, and duty ratios thereof are, for example, 50%, which is constant.

In a case of realizing the function of the pulse generator 138 with the analog circuit, such a circuit which bisects a triangular wave with a comparator and outputs the gate pulse signal P1 in the case of the top half of the triangular wave and the gate pulse signal P2 in the case of the lower half thereof may be constituted. In a case of realizing the function of the pulse generator 138 with the digital circuit, a circuit which alternately outputs H level signals in a sampling cycle corresponding to the frequency of the frequency variable signal FS may be constituted.

Next, operations of the power conversion apparatus 10 are described. The operations at the time a positive voltage is applied to the alternating voltage power supply E are described. In a case in which a negative voltage is applied to the alternating voltage power supply E, a route which uses full-wave rectification diodes D3 and D2 is formed. However, output voltages of the diodes after full-wave rectification become equal to a case in which the positive voltage is applied to the alternating voltage power supply E. Thus, the description thereof is omitted herein.

(A Mode M1 . . . the Switch S1 is Turned Off, and the Switch S2 is Turned on)

In a state in which the switch S2 is turned on, if the alternating voltage power supply E is considered as a base point, the closed loop is formed by the route of the alternating voltage power supply E→the diode D1→the switch S2→the capacitor C2→the inductor L1→the capacitor C12→the alternating voltage power supply E. Further, if the inductor L1 is considered as a base point, the closed loop of the inductor L1→the capacitor C11→the diode D1→the switch S2→the capacitor C2→the inductor L1 is also formed. As a result, a circuit current I is supplied from the alternating voltage power supply E to the inductor L1. The circuit current I increases with the elapse of time. Magnetic energy stored in the inductor L1 increases together with the increase in the circuit current I. At this time, as the switch S2 is in a conduction state, the voltage of the midpoint m of the switches S1 and S2 is equal to that of the alternating voltage power supply E.

(A Mode M2 . . . and the Switch S2 is Turned Off)

If the switch S2 is turned off from the state of the mode M1, the power conversion apparatus 10 functions in such a way as to maintain the current flowing to the inductor L1. Thus, the power conversion apparatus 10 releases the magnetic energy stored in the inductor L1. As a result, if the inductor L1 is considered as a starting point, the circuit current I flows through the closed loop of the inductor L1→the capacitor C11→the diode D1→the diode D5→the smoothing capacitor C3→the diode D6→the body diode of the switch S1→the capacitor C2→the inductor L1. At the same time, a route via the alternating voltage power supply E, that is, a closed loop of the alternating voltage power supply E→the diode D1→the diode D5→the smoothing capacitor C3→the diode D6→the body diode of the switch S1→the capacitor C2→the inductor L1→the capacitor C12→the alternating voltage power supply E is formed and the circuit current I flows through the closed loop. The current flowing through the two closed loop acts in a direction of increasing the charge of the electric charge of the smoothing capacitor C3. In other words, the magnetic energy stored in the inductor L1 in the mode M1 is converted to electric energy by increasing the voltage of the smoothing capacitor C3 in the mode M2.

(A Mode M3 . . . and the Switch S1 is Turned on)

In the mode M2, the circuit current I flows via the body diode in the switch S1. Thus, a both-end voltage of the switch S1 is 0 V. In this state, the switch S1 is turned on. Even if the switch S1 is turned on, as the circuit current I originally flows to the switch S1 in the reverse direction, no change occurs in the operation.

(A Mode M4 . . . and the Switch S1 is Turned on)

If time elapses for a while after the switch S1 is turned on, the direction of the circuit current I is reversed through the function of series resonance of the capacitor C2 and the inductor L1. As a result, if the inductor L1 is considered as a starting point, the circuit current I flows through the closed loop of the inductor L1→the capacitor C2→the switch S1→the diode D4→the capacitor C12→the inductor L1. At the same time, a route via the alternating voltage power supply E, that is, a closed loop of the alternating voltage power supply E→the capacitor C11→the inductor L1→the capacitor C2→the switch S1→the diode D4→the alternating voltage power supply E is formed and the circuit current I flows through the closed loop. Therefore, the magnetic energy stored in the inductor L1 is increased by the circuit current I.

(A Mode M5 . . . and the Switch S1 is Turned Off)

If the switch S1 is turned off from the state of the mode M4, the power conversion apparatus 10 functions in such a way as to maintain the current flowing to the inductor L1. As a result, if the inductor L1 is considered as a starting point, the circuit current I flows through the closed loop of the inductor L1→the capacitor C2→the body diode of the switch S2→the diode D5→the smoothing capacitor C3→the diode D6→the diode D→the capacitor C12→the inductor L1. At the same time, a route via the alternating voltage power supply E, that is, a closed loop of the alternating voltage power supply E→the capacitor C11→the inductor L1→the capacitor C2→the body diode of the switch S2→the diode D5→the smoothing capacitor C3→the diode D6→the diode D4→the alternating voltage power supply E is formed and the circuit current I flows through the closed loop. With the circuit current I flowing through the two closed loops, the power conversion apparatus 10 functions in a direction of increasing a charge quantity of an electric charge of the smoothing capacitor C3. In other words, the magnetic energy stored in the inductor L1 in the mode M4 is converted to electric charge energy of the smoothing capacitor C3 in the mode M5.

(A Mode M6 . . . and the Switch S2 is Turned on)

In the state of the mode M5, a potential difference of both ends of the switch S2 is 0 V. Thus, in this state, even if the switch S2 is turned on, no change occurs in the operation at this point in time. However, after that, the direction of the circuit current I is reversed through the function of the series resonance of the capacitor C2 and the inductor L1. If the direction of the circuit current I is reversed, as the switch S2 is turned on, if the inductor L1 is considered as the base point, the circuit current I flows through a closed loop of the inductor L1→the capacitor C11→the diode D1→the switch S2→the capacitor C2→the inductor L1. If the alternating voltage power supply is considered as a base point, the circuit current I flows through the closed loop of the alternating voltage power supply E→the diode D1→the switch S2→the capacitor C2→the inductor L1→the capacitor C12→the alternating voltage power supply E. In other words, the power conversion apparatus 10 returns to the state of the mode M1.

After that, during a period when the alternating voltage power supply E is positive, the operations in the modes M1~M6 are repeated in the power conversion apparatus 10.

As described above, through the operations of the mode M1 and the mode M4, the power conversion apparatus 10 temporarily converts electrical energy by the voltage supply of the alternating voltage power supply E to the magnetic energy in the inductor L1. Through the operations of the following modes M2 and M3 and modes M5 and M6, the power conversion apparatus 10 converts the magnetic energy to electrical energy due to the electric charge of the smoothing capacitor C3 again.

A voltage appearing at both ends of the switch S1 in the operation in each of the modes M1~M6 is as follows. In the mode M1, the switch S2 is turned on. Thus, the full-wave rectified voltage is applied to both ends of the switch S1. In the mode M2 and the mode M3, a return current flows to the switch S1. Thus, the both-end voltage of the switch S1 is 0 V. In the mode M4, the switch S1 is turned on. Thus, the both-end voltage of the switch S1 is 0 V as it is. In the mode M5 and the mode M6, a return current flows to the body diode of the switch S2. Through the return current, the charge operation to the smoothing capacitor C3 is carried out. At this time, the voltage of the smoothing capacitor C3 is applied to both the ends of the switch S1. The voltage of the smoothing capacitor C3 is higher than the full-wave rectified voltage. If returning to the mode M1 again, the both-end voltage of the switch S1 decreases to the full-wave rectified voltage.

For the switch 2, through symmetry of the circuit and the complementation with the switch 1, the same both-end voltage occurs at the reverse phase of the switching cycle.

Then, in the power conversion apparatus 10 the operations of which in the modes M1~M6 are repeated, ZVS (Zero Voltage Switching) conditions are established in the mode M3 and the mode M6. States of the establishment of the ZVS conditions are described in detail with reference to FIG. 3 and FIG. 4.

Figure 3:
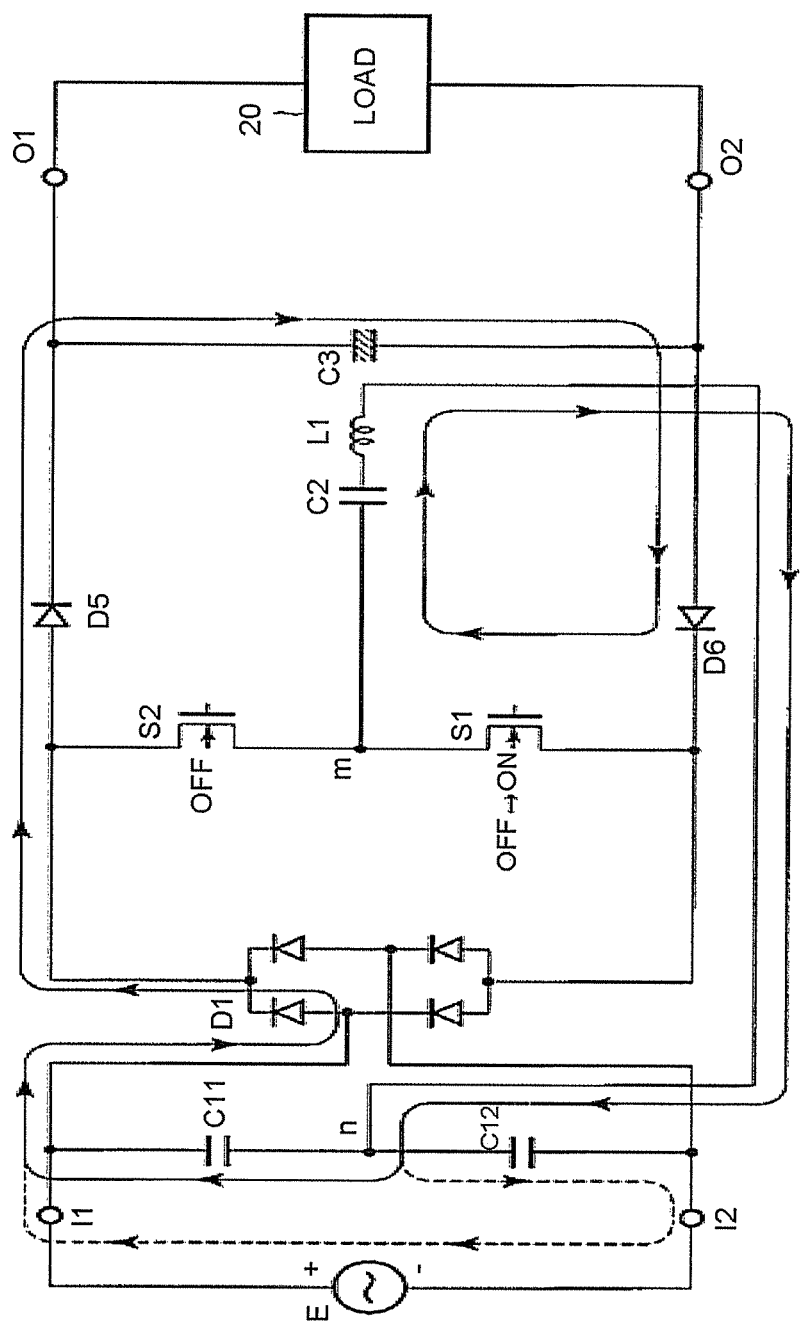
FIG. 3 is a circuit diagram illustrating establishment of a ZVS condition according to the first embodiment.

FIG. 3 illustrates a state in which the circuit current I flows through the closed loop of the inductor L1→the capacitor C11→the diode D1→the diode D5→the smoothing capacitor C3→the diode D6→the body diode of the switch S1→the capacitor C2→the inductor L1 and the closed loop of the alternating voltage power supply E→the diode D1→the diode D5→the smoothing capacitor C3→the diode D6→the body diode of the switch S1→the capacitor C2→the inductor L1→the capacitor C12→the alternating voltage power supply E in the mode M2. In this state, the both-end voltage of the switch S1 is 0 V. Thus, from the state, even if the switch S1 is turned on in the mode M3, the both-end voltage of the switch S1 is 0 V as it is. Thus, switching loss does not occur. In other words, the ZVS condition is established.

Figure 4:
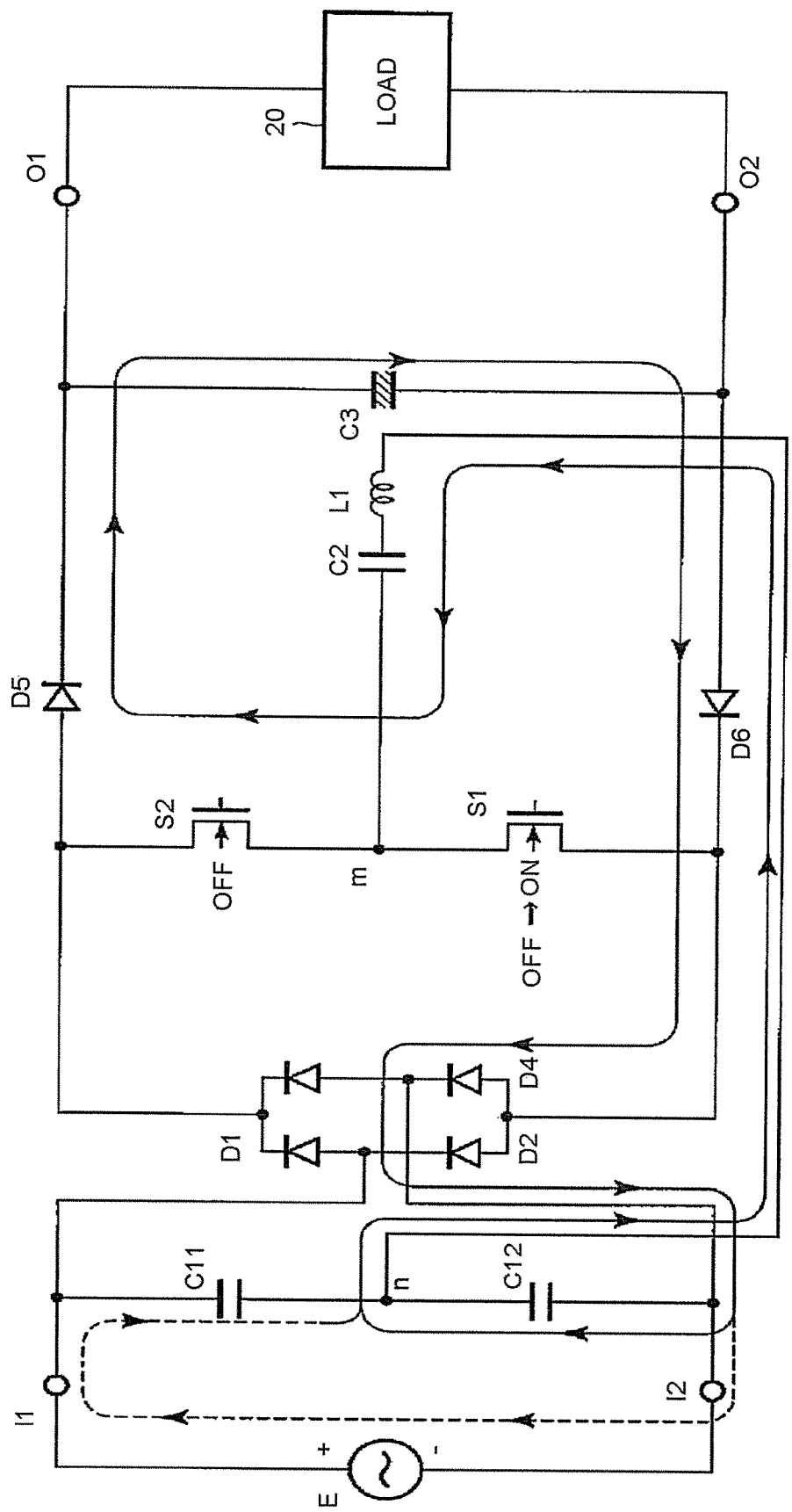
FIG. 4 is a circuit diagram illustrating the establishment of the ZVS condition according to the first embodiment.

FIG. 4 illustrates a state in which the circuit current I flows through the closed loop of the inductor L1→the capacitor C2→the body diode of the switch S2→the diode D5→the smoothing capacitor C3→the diode D6→the diode D4→the capacitor C12→the inductor L1 and the closed loop of the alternating voltage power supply E→the capacitor C11→the inductor L1→the capacitor C2→the body diode of the switch S2→the diode D5→the smoothing capacitor C3→the diode D6→the diode D4→the alternating voltage power supply E in the mode M5. In this state, as the return current flows through the body diode of the switch S2, the both-end voltage of the switch S2 is 0 V. Thus, in the state, even if the switch S2 is turned on, the both-end voltage of the switch S2 is 0 V as it is. Thus, the switching loss does not occur. In other words, the ZVS condition is established.

Figure 5:
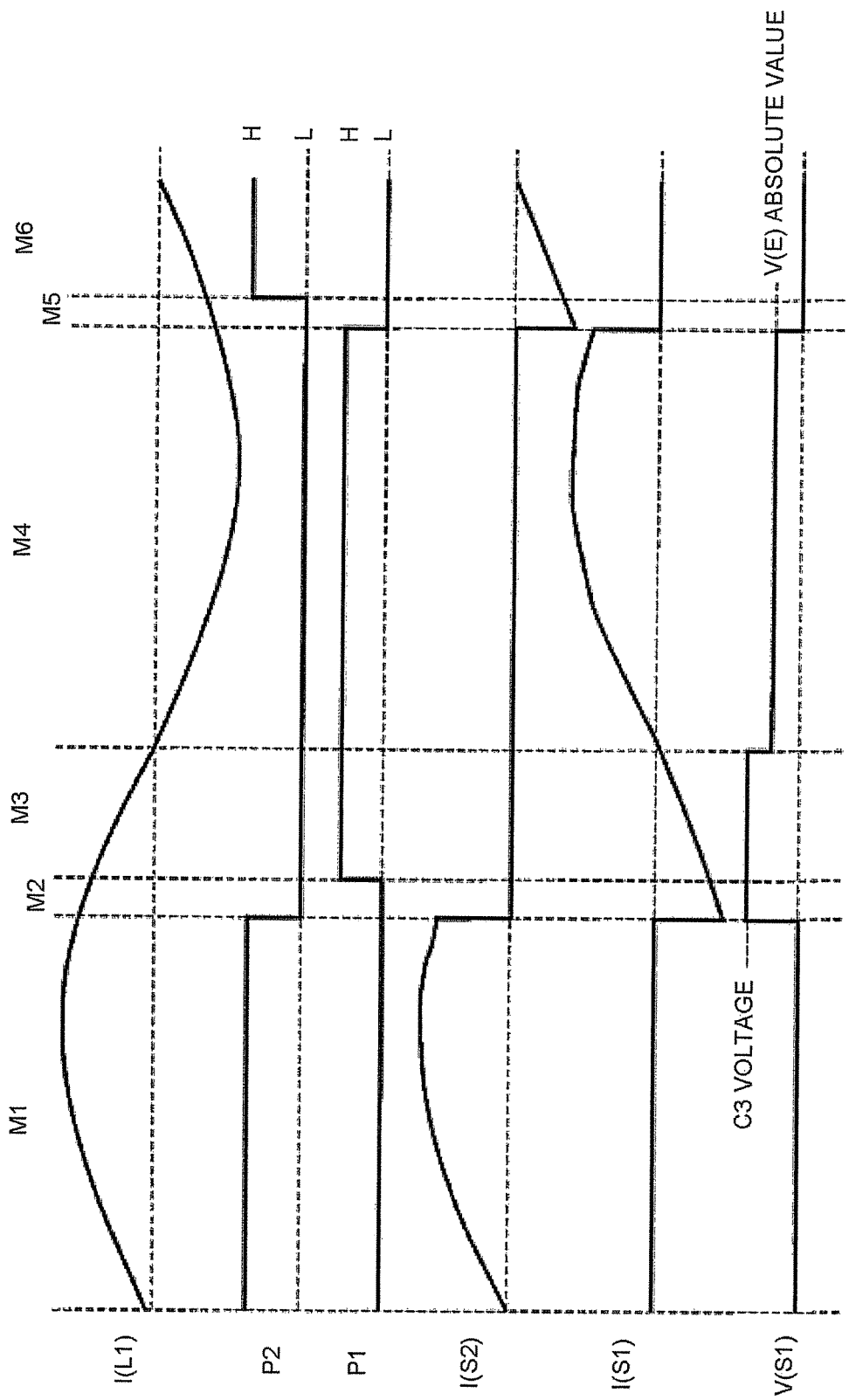
FIG. 5 is a timing diagram illustrating waveforms of main portions at the time of operating at a switching frequency of 50 kHz according to the first embodiment.

Next, with reference to a timing diagram in FIG. 5, details of operations in one cycle at the time of operating at a high frequency of, for example, 50 kHz are described. Waveforms in FIG. 5 represent waveforms of a circuit current I (L1) flowing to the inductor L1, the gate pulse signal P2 applied to the gate terminal of the switch S2, the gate pulse signal P1 applied to the gate terminal of the switch S1, an current I (S2) flowing to the switch S2, a current I (S1) flowing to the switch S1, and a voltage V (S1) applied to both the ends of the switch S1 in the order from top to bottom. In FIG. 5, the horizontal axis indicates the time axis, M1~M6 indicate the modes M1~M6 described above.

In the mode M1, the gate pulse signal P2 to the switch S2 is a high level "H" (or high frequency), and the switch S2 is turned on. Thus, the current full-wave rectified by the diode bridge circuits D1~D4 flows into the inductor L1. Thus, the current I (L1) flows to the inductor L1 from the capacitor C2 to the capacitor C11 or C12. The current I (L1) is represented as a positive current in FIG. 5. In the mode M1, at first, the current I (L1) increases slowly. Then, after a short time, the direction of the current I (L1) is reversed and changes downwards through the function of LC series resonance.

In the next mode M2, if the gate pulse signal P2 is a low level "L" (or low frequency), the switch S2 is turned off. As the switch S2 is turned off, the current I (S2) flowing through the switch S2 becomes zero. On the other hand, in the switch S1, a reverse current flows via the body diode.

In the next mode M3, if the gate pulse signal P1 becomes the high level "H", the switch S1 is turned on. However, in the switch S1, the current already flows to the body diode in the mode M2, and thus the direction of the current I (S1) flowing through the switch S1 does not change. After a short time, the direction of the current I (L1) is reversed through the function of the LC series resonance, and is automatically switched to the mode M4. Then, the positive current continuously flows to the switch S1. At this time, as the switch S1 is in the on state, the current operation phenomenon at the switch S1 side is identical to that in the mode M1.

In the next mode M5, if the gate pulse signal P1 is the low level "L", the switch S1 is turned off. If the switch S1 is turned off, the current I (S1) flowing through the switch S1 is stopped. Then, instead, the current for charging the electric charge of the smoothing capacitor C3 flows via the body diode of the switch S2.

In the next mode M6, if the gate pulse signal P2 is the high level "H", the switch S2 is turned on. At this time, as the switch S2 is in a state in which the current flows to the body diode, the direction of the current I (S2) flowing through the switch S2 does not change. After a short time, the direction of the current I (L1) is reversed through the function of the LC series resonance, and is automatically switched to the mode M1.

As a result, three kinds of voltages including zero, the absolute value of the voltage V (E) of the alternating voltage power supply E and the voltage of the smoothing capacitor C3 are generated at both the ends of the switch S1.

Figure 6:
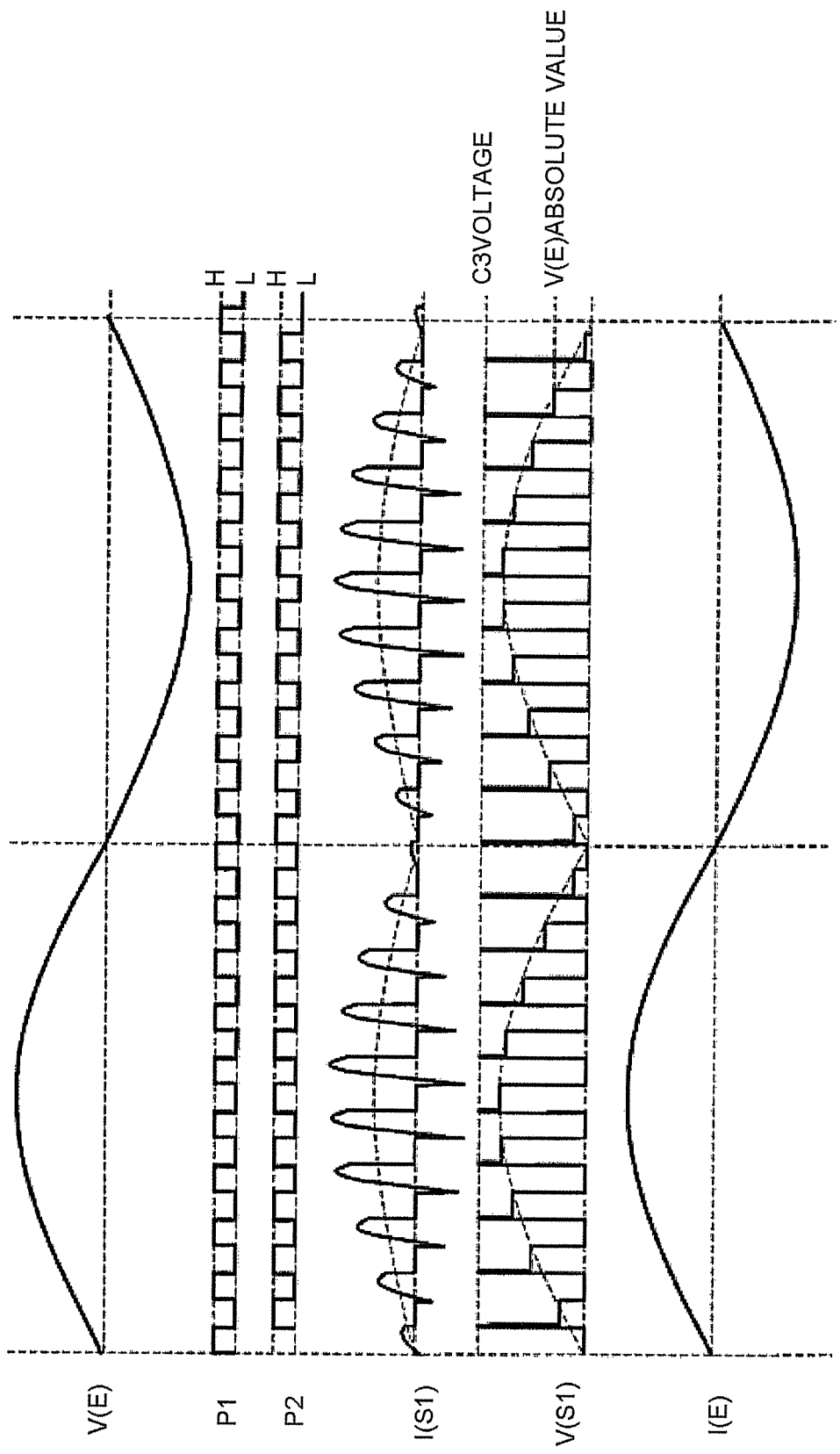
FIG. 6 is a timing diagram illustrating waveforms of the main portions of one cycle when an alternating voltage power supply Hz is input at a frequency of 50 according to the first embodiment.

Next, with reference to a timing diagram in FIG. 6, operations with respect to the alternating voltage power supply E are described. Waveforms in FIG. 6 represent waveforms of the gate pulse signal P1 applied to the gate terminal of the switch S1, the gate pulse signal P2 applied to the gate terminal of the switch S2, the current I (S1) flowing to the switch S1, the voltage V (S1) applied to both the ends of the switch S1 and the current I (E) flowing to the alternating voltage power supply E in order from top to bottom. The horizontal axis indicates the time axis, and represents one cycle at the time of operating at a low frequency of 50 Hz of the alternating current. However, for the sake of easily understanding FIG. 6, one cycle at the time of operating at the high frequency of 50 kHz is roughly expressed.

An oscillating frequency in one cycle of a voltage V (E) of the alternating voltage power supply E is fixed. Thus, a switching operation is carried out at the same frequency no matter whether an alternating voltage E is at a low phase or at a high phase. Thus, the current I (S1) flowing to the switch S1 also increases in proportion to the increase in the voltage V (E) of the alternating voltage power supply E. As a result, the input current waveform becomes a sine-wave shape current waveform substantially equal to the input voltage waveform.

If the both-end voltage V (S1) of the switch S1 is viewed, three kinds of voltage values exist. In other words, when the switch S1 is turned on, the voltage is zero; however, when the switch S1 is turned off, the case of the voltage equal to that of the smoothing capacitor C3 and the case of the absolute value of the voltage V (E) of the alternating voltage power supply E are mixed. The voltage in the reflux state immediately after the switch S1 is turned off, in other words, the voltage charged to the smoothing capacitor C3 becomes equal to the voltage of the smoothing capacitor C3. After that, at the time the current is forward rotated to flow to the switch S1, the voltage V (S1) becomes equal to the absolute value of the voltage V (E) of the alternating voltage power supply E.

As stated above, in the power conversion apparatus 10, by alternately turning on and off the switch S1 and the switch S2, the voltage of the smoothing capacitor C3 rises. In a case in which the voltage of the smoothing capacitor C3 is higher than a predetermined voltage, the oscillating frequency rises, and the circuit current is reduced. As a result, the voltage of the smoothing capacitor C3 is reduced to the predetermined voltage. On the contrary, in a case in which the voltage of the smoothing capacitor C3 is lower than the predetermined voltage, the oscillating frequency is reduced, and the circuit current increases. As a result, the voltage of the smoothing capacitor C3 rises to the predetermined voltage. In this way, the voltage generated between both the terminals of the smoothing capacitor C3 is detected, and a negative feedback loop can be formed by controlling the oscillating frequency. As a result, the output voltage to the load 20 can be always kept constant.

A unit at which the oscillating frequency changes is a cycle unit of the frequency of the full-wave rectified pulsating current, and the oscillating frequency is kept constant in at least one cycle. Thus, the circuit current I becomes an in-phase sine-wave shape synchronized with the voltage of the alternating voltage power supply E. In other words, when the voltage of the alternating voltage power supply E is high, the circuit current also becomes large, and when the voltage of the alternating voltage power supply E is low, the circuit current also becomes small. As a result, the input current becomes a substantially sine-wave shape. Thus, an action effect identical to the PFC circuit is obtained without particularly carrying out current control.

Thus, by using the power conversion apparatus 10 of the present embodiment, the input current can be the sine-wave shape through only simple control, and harmonic noise of the current can be reduced. As the low loss switching operation is carried out, high-efficiency power conversion can be realized. Further, by returning the control to the oscillating frequency, the output voltage can be kept constant. Thus, according to the power conversion apparatus 10, excellent effects such as miniaturization, reduction in noise and stability of operations of the apparatus relating to AC-DC power conversion can be expected.

Second Embodiment

Next, a power conversion apparatus 10A of the second embodiment is described. Only the different point between the power conversion apparatus 10A of the second embodiment and the power conversion apparatus 10 of the first embodiment is described.

Figure 7:
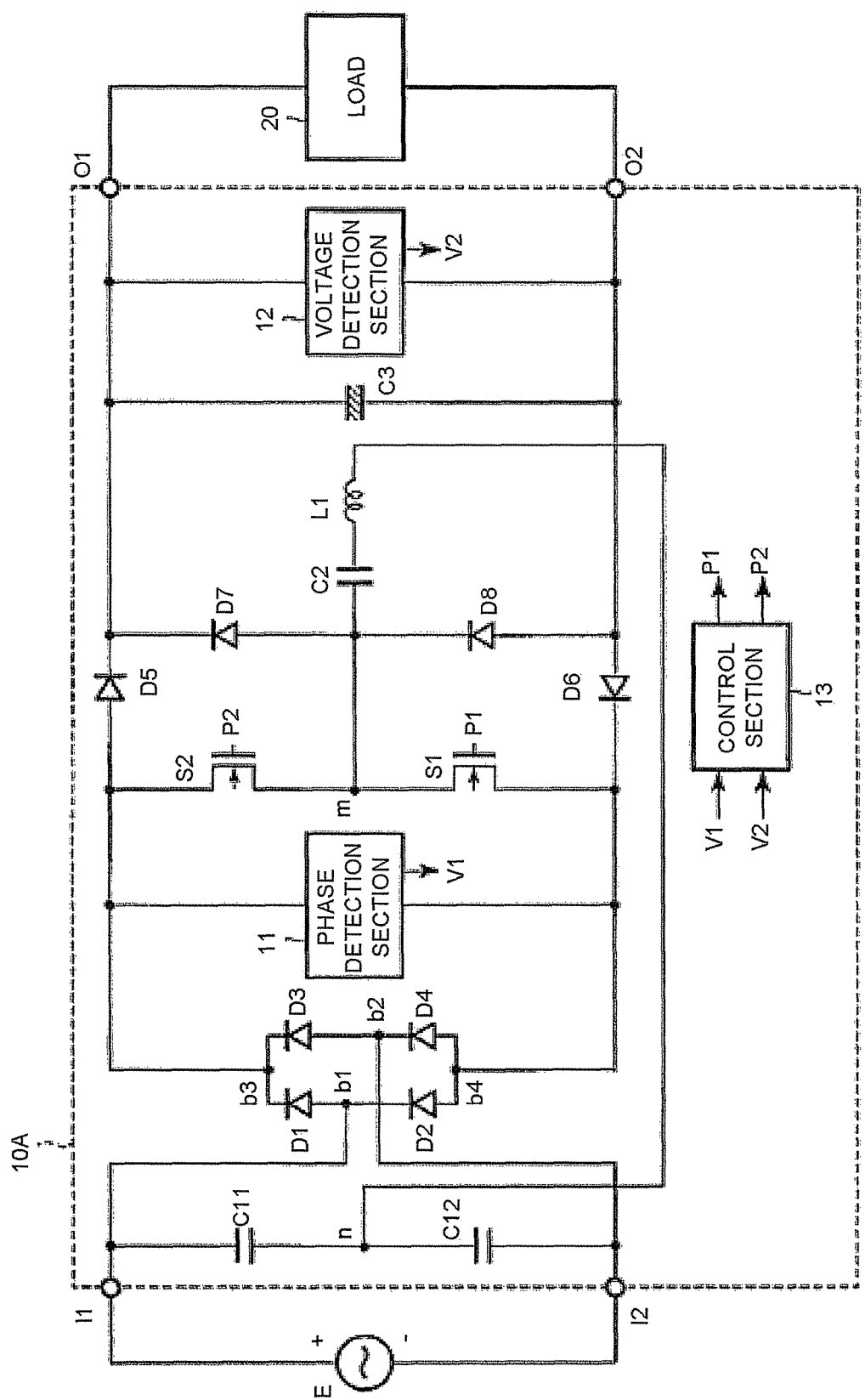
FIG. 7 is a circuit diagram illustrating a power conversion apparatus according to a second embodiment.

FIG. 7 is a circuit diagram of the power conversion apparatus 10A. The power conversion apparatus 10A connects the connection point between the midpoint m of the switch S1 and the switch S2 and the capacitor C2 to the cathode of a diode D8 and the anode of a diode D7. The cathode of the diode D7 is connected to the connection point between the diode D5 and the smoothing capacitor C3. The anode of the diode D8 is connected to the connection point between the smoothing capacitor C3 and the diode D6. In other words, the power conversion apparatus 10A is equipped with the diode D7 so as to short cut the current flowing to the diode D5 through the body diode of the switch S2. Similarly, the power conversion apparatus 10A is equipped with the diode D8 so as to short cut the current flowing to the diode D6 through the body diode of the switch S1.

Next, the operations of the power conversion apparatus 10A when the positive voltage is applied to the alternating voltage power supply E are described. As the basic operations are the same as those of the power conversion apparatus 10, only a difference is explained.

(The Mode M1 . . . the Switch S1 is Turned Off, and the Switch S2 is Turned on)

The operations of the power conversion apparatus 10A are the same as those of the power conversion apparatus 10.

(The Mode M2 . . . the Switch S2 is Turned Off)

In the power conversion apparatus 10, the circuit current I flows from the smoothing capacitor C3 via the body diode of the switch S1 and the diode D6 to the capacitor C2 and further to the inductor L1. In the power conversion apparatus 10A, the circuit current I flows from the smoothing capacitor C3 to the capacitor C2 and further to the inductor L1 via the diode D8 without passing through the diode D6 and the body diode of the switch S1.

(The Mode M3 . . . the Switch S1 is Turned on)

Similarly to the case in the mode M2, the circuit current I flows from the smoothing capacitor C3 to the capacitor C2 and further to the inductor L1 via the diode D8 without passing through the diode D6 and the body diode of the switch S1.

(The Mode M4 . . . the Switch S1 is Turned on)

The operations of the power conversion apparatus 10A are the same as those of the power conversion apparatus 10.

(The Mode M5 . . . the Switch S1 is Turned Off)

In the power conversion apparatus 10, the circuit current I flows from the capacitor C2 via the body diode of the switch S2 and the diode D5 to the smoothing capacitor C3. In the power conversion apparatus 10A, the circuit current I flows from the capacitor C2 to the smoothing capacitor C3 via the diode D7 without passing through the diode D5 and the body diode of the switch S2.

(The Mode M6 . . . the Switch S2 is Turned on)

Similarly to the case in the mode M5, the circuit current I flows from the capacitor C2 to the smoothing capacitor C3 via the diode D7 without passing through the diode D5 and the body diode of the switch S2.

Even in the power conversion apparatus 10A which operates as above, the ZVS (Zero Voltage Switching) condition is also established in the mode M3 and in the mode M6. The states are described with reference to FIG. 8 and FIG. 9.

Figure 8:
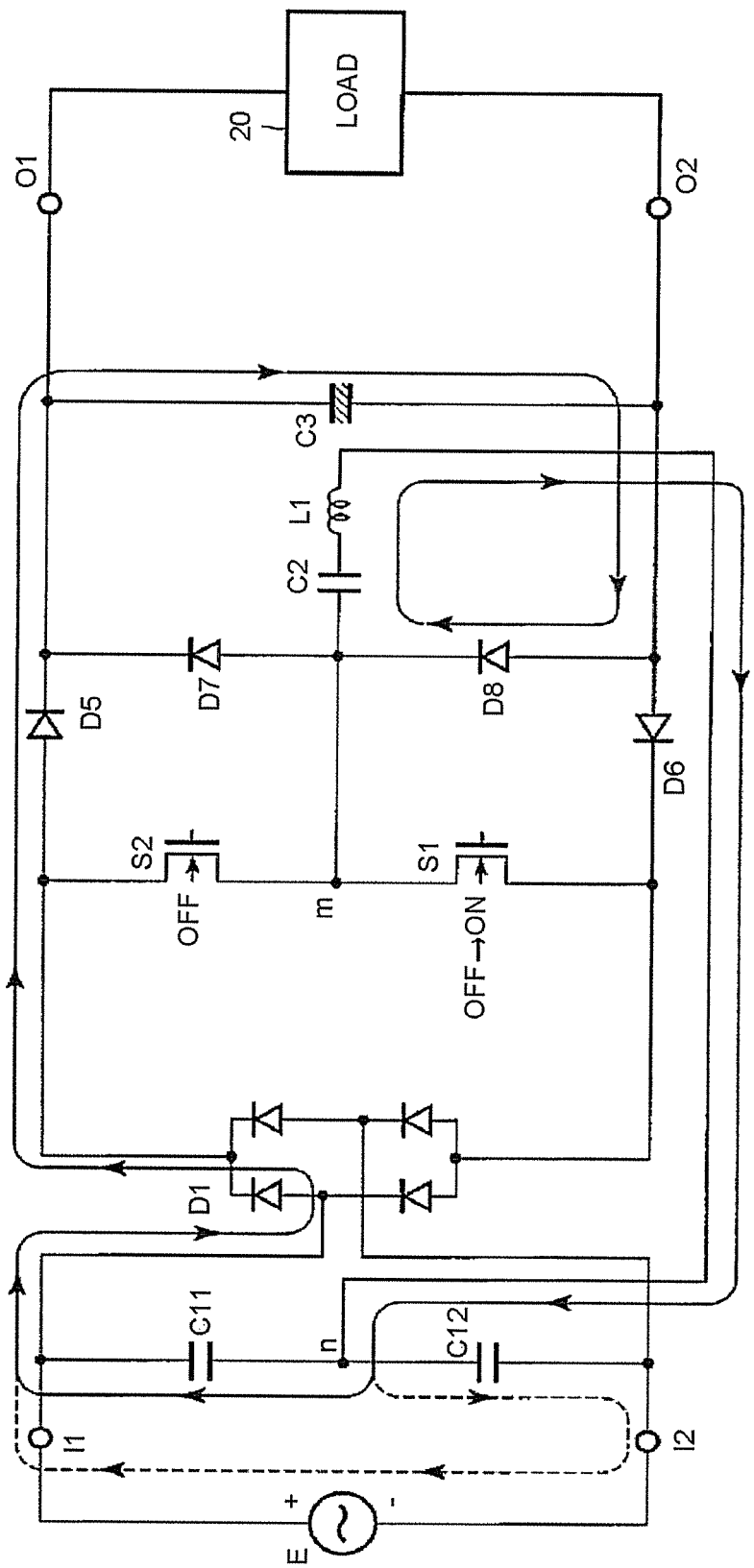
FIG. 8 is a circuit diagram illustrating establishment of a ZVS condition according to the second embodiment.

FIG. 8 illustrates a state in which the circuit current I flows through the closed loop of the inductor L1→the capacitor C11→the diode D1→the diode D5→the smoothing capacitor C3→the diode D8→the capacitor C2→the inductor L1 and the closed loop of the alternating voltage power supply E→the diode D1→the diode D5→the smoothing capacitor C3→the diode D8→the capacitor C2→the inductor L1→the capacitor C12→the alternating voltage power supply E in the mode M2. In this state, the current flows to the diode D8. Thus, the both-end voltage of the series circuit of the diode D6 and the switch S1 is 0 V. Thus, even if the switch S1 is turned on in the mode M3, as the current continuously flows via the diode D8, the current flowing through the switch S1 is zero. Thus, switching loss does not occur. In other words, the ZVS condition is established.

Figure 9:
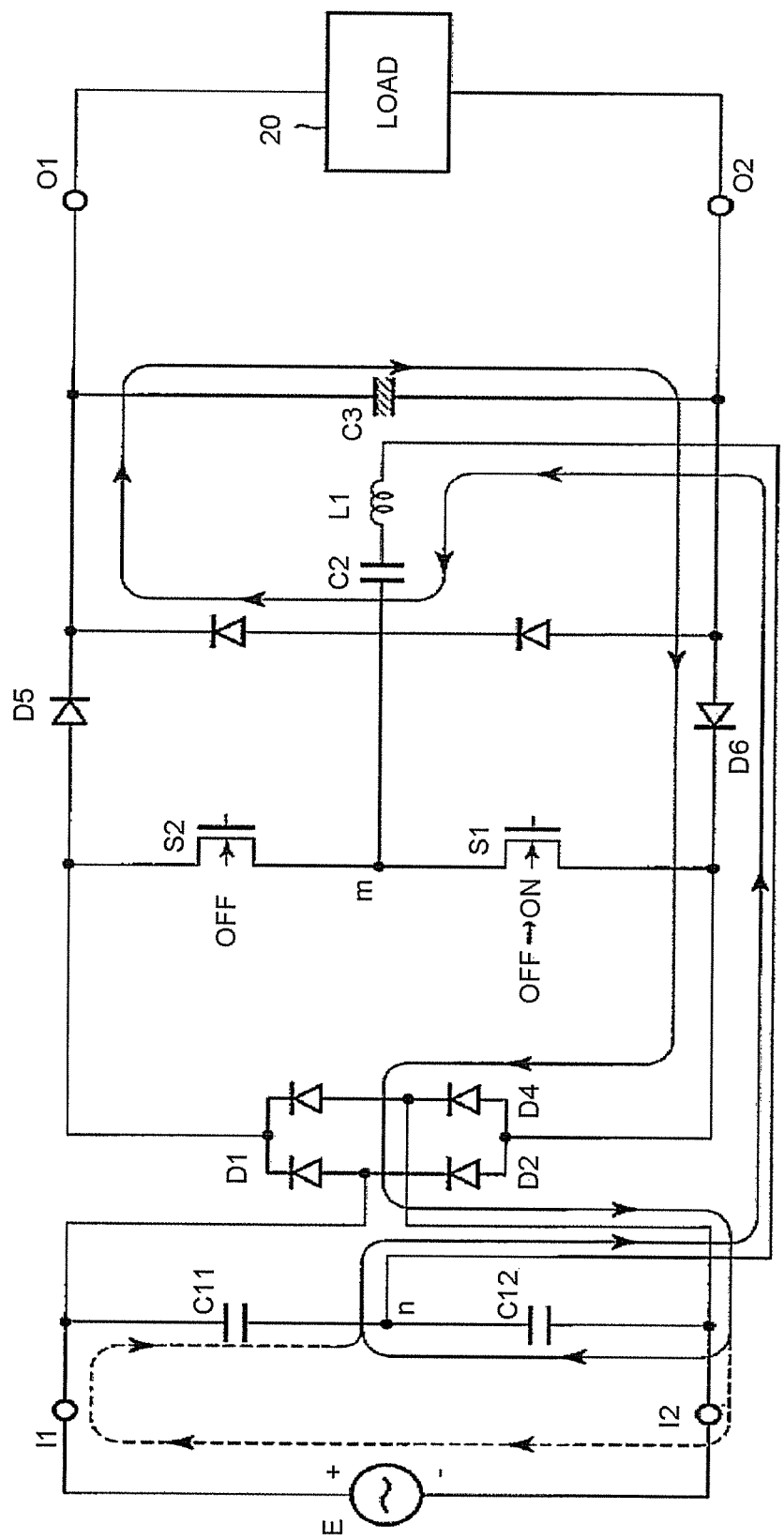
FIG. 9 is a circuit diagram illustrating the establishment of the ZVS condition according to the second embodiment.

FIG. 9 illustrates a state in which the circuit current I flows through the closed loop of the inductor L1→the capacitor C2→the diode D7→the smoothing capacitor C3→the diode D6→the diode D4→the capacitor C12→the inductor L1 and the closed loop of the alternating voltage power supply E→the capacitor C11→the inductor L1→the capacitor C2→the diode D7→the smoothing capacitor C3→the diode D6→the diode D4→the alternating voltage power supply E in the mode M5. In this state, the current flows to the diode D7. Thus, the both-end voltage of the series circuit of the diode D5 and the switch S2 is 0 V. Thus, even if the switch S2 is turned on in the mode M6, as the current continuously flows via the diode D7, the current flowing through the switch S2 is zero. Thus, switching loss does not occur. In other words, the ZVS condition is established.

As stated above, the power conversion apparatus 10A is different from the power conversion apparatus 10 in that the power conversion apparatus 10A is additionally equipped with the diode D7 bypassing the switch S2 and the diode D5 and the diode D8 bypassing the diode D6 and the switch S1. Thus, the power conversion apparatus 10A can achieve the same effect as the power conversion apparatus 10.

Moreover, for example, if the voltage due to the ON resistance of the switches S1 and S2 is assumed to be 0.5 V, and a PN junction voltage of the diodes D5~D8 is assumed to be 0.9 V, a total potential difference of 1.4V is generated at both ends of the series circuit of the switch S2 and the diode D5. Similarly, a total potential difference of 1.4V is also generated at both ends of the series circuit of the switch S1 and the diode D6. Supposedly, if the current is 1.0 A, the power loss W in these series circuits is an instantaneous value of 1.4 V×10 A. On the other hand, in the power conversion apparatus 10A, current flows through the diodes D7 and D8 without flowing through the series circuit of the diode D6 and the switch S1 and the series circuit of the switch S2 and the diode D5. Thus the power loss W is the instantaneous value of 0.9 V×10 A when the current flows through the diodes D7 and D8. Therefore, according to the power conversion apparatus 10A, it is possible to realize power conversion at the higher efficiency than the power conversion apparatus 10.

Third Embodiment

Next, a power conversion apparatus 10B of the third embodiment is described. The power conversion apparatus 10B of the third embodiment is different from the power conversion apparatus 10 of the first embodiment in a part of the configuration of the control section 13. As the rest are identical to that of the power conversion apparatus 10 except the different part, the same reference numerals are applied to the common parts, and the descriptions thereof are omitted.

Figure 10:
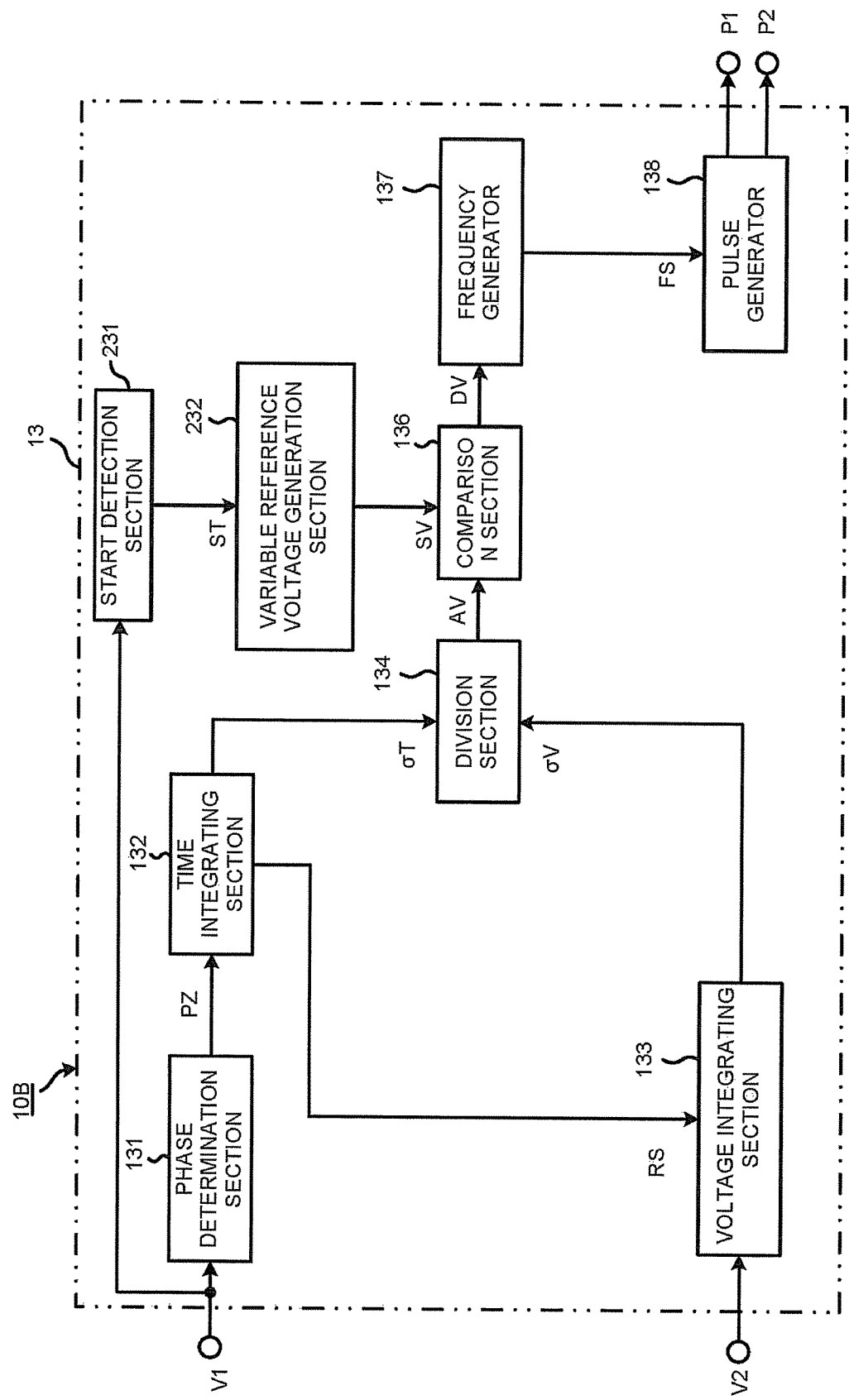
FIG. 10 is a block diagram illustrating the internal configuration of a control section according to a third embodiment.

FIG. 10 is a block diagram illustrating the internal configuration of a control section 13 included in the power conversion apparatus 10B. The control section 13 of the power conversion apparatus 10B includes a start detection section 231 in addition to the phase determination section 131, the time integrating section 132, the voltage integrating section 133, the division section 134, the comparison section 136, the frequency generator 137 and the pulse generator 138. Further, instead of the reference voltage generation section 135, the control section 13 of the power conversion apparatus 10B includes a variable reference voltage generation section 232.

The start detection section 231 inputs the phase detection signal V1 output from the phase detection section 11. The start detection section 231 detects that application of the alternating voltage from the alternating voltage power supply E is started from the phase detection signal V1. If it is detected that the application of the alternating voltage is started, the start detection section 231 outputs a start signal ST to the variable reference voltage generation section 232.

In a case of realizing the function of the start detection section 231 with the analog circuit, a circuit which can replace the phase detection signal V1 with the voltage rise by the CR time constant may be used. In a case of realizing the function of the start detection section 231 with the digital circuit, a circuit which detects that the voltage is maintained for a predetermined time after the voltage is generated from sampled data of the phase detection signal V1 may be constituted.

The variable reference voltage generation section 232 generates the reference voltage SV of the direct voltage in response to the input of the start signal ST. The reference voltage SV starts from a high state. Then, the variable reference voltage generation section 232 carries out an operation of slowly lowering the reference voltage. The variable reference voltage generation section 232 outputs the reference voltage SV to the comparison section 136.

In a case of realizing the function of the variable reference voltage generation section 232 with the analog circuit, a variable voltage three-terminal regulator may be used. In a case of realizing the function of the variable reference voltage generation section 232 with the digital circuit, it may be constituted to appropriately update the voltage value written into the register circuit for setting the reference voltage.

Similar to the first embodiment, the average voltage AV is also input to the comparison section 136 from the division section 134. In addition to the comparison section 136, furthermore, the frequency generator 137 and the pulse generator 138 at the rear stage function similar to the first embodiment.

In the power conversion apparatus 10B including the start detection section 231 and the variable reference voltage generation section 232, after the alternating voltage power supply E is input, the switching of the switch S1 and the switch S2 is started in a state in which the frequency is extremely high (for example, 200 kHz). As power transfer is small if the frequency is high, a boosting action of the smoothing capacitor C3 is weak. Further, the input current flowing to the alternating voltage power supply E is also small. From the state, the frequency of the switching is slowly reduced. Eventually, the frequency of the switching is reduced to a value about a frequency (for example, 50 kHz) in a normal operation range. According to the reduction in the frequency, the boosting action to the smoothing capacitor C3 becomes strong. Further, the input current flowing to the alternating voltage power supply E slowly becomes large. Thus, a soft-start function for rising gradually can be realized.

In this way, an excessive current can be prevented from flowing to the circuit at the time of the input of the alternating voltage power supply E by adding the soft-start function to the control section 13.

Third Embodiment

Next, a power conversion apparatus 10C of the fourth embodiment is described.

Figure 11:
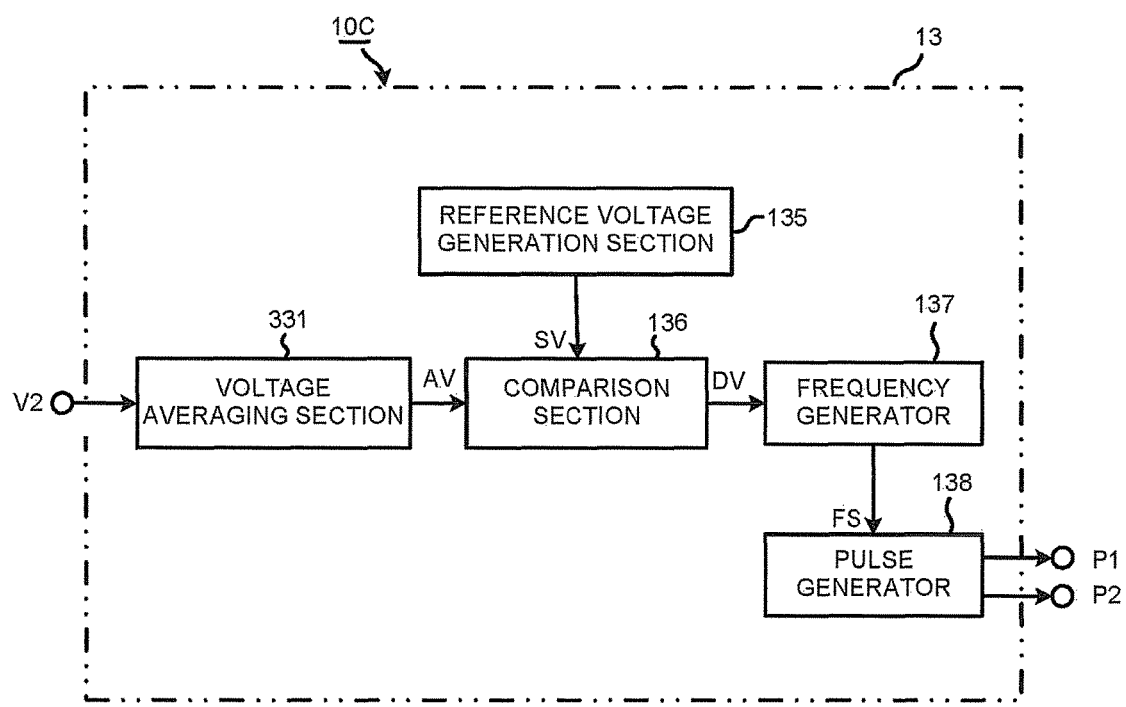
FIG. 11 is a block diagram illustrating the internal configuration of a control section according to a fourth embodiment.

FIG. 11 is a block diagram illustrating the internal configuration of a control section 13 of the power conversion apparatus 10C. As shown in FIG. 11, the control section 13 inputs the voltage detection signal V2 output from the voltage detection section 12. The phase detection signal V1 is not input. Thus, the power conversion apparatus 10C can omit the phase detection section 11 in the circuit diagram of the power conversion apparatus 10 shown in FIG. 1.

The control section 13 of the power conversion apparatus 10C includes the reference voltage generation section 135, the comparison section 136, the frequency generator 137 and the pulse generator 138. Further, instead of the phase determination section 131, the time integrating section 132, the voltage integrating section 133 and the division section 134, the control section 13 of the power conversion apparatus 10C includes a voltage averaging section 331.

The voltage averaging section 331 calculates an average value of the voltages detected by the voltage detection section 12. Then, the voltage averaging section 331 outputs the average voltage AV to the comparison section 136.

If the frequency of the alternating voltage power supply E is set to, for example, 50 Hz, the voltage detected by the voltage detection section 12 includes a ripple component of a frequency 100 Hz of the pulsating current full-wave rectified by the diode bridge circuits D1~D4. Thus, if the voltages at random time points of the voltages are sampled, a correct average voltage AV is not obtained. Thus, the voltage averaging section 331 uses an element having a sufficient smoothing effect on the frequency 100 Hz of the pulsating current. For example, the voltage averaging section 331 may be constituted with a filter circuit of which a band width is 10 Hz. In this way, though not the real average value, the average voltage AV output from the voltage averaging section 331 can be a value substantially equal to the average value.

Similar to the first embodiment, the reference voltage SV is also input to the comparison section 136 from the reference voltage generation section 135. In addition to the comparison section 136, furthermore, the frequency generator 137 and the pulse generator 138 at the rear stage function similar to the first embodiment.

Even in the power conversion apparatus 10C including the voltage averaging section 331, by alternately turning on and off the switch S1 and the switch S2, the voltage of the smoothing capacitor C3 rises. In a case in which the voltage of the smoothing capacitor C3 is higher than a predetermined voltage, the oscillating frequency rises, and the circuit current is reduced. On the contrary, in a case in which the voltage of the smoothing capacitor C3 is lower than the predetermined voltage, the oscillating frequency is reduced, and the circuit current increases. Thus, the same action effect as the first embodiment can be realized by omitting the phase detection section 11.

Hereinafter, other embodiments are described.

In each embodiment, the oscillating frequency is fixed to the high frequency of 100 Hz. As another embodiment, a weak frequency modulation is applied to correct the waveform. The same action effect as each embodiment can be realized even if such a configuration is adopted.

In each embodiment, feedback for voltage control is only the output voltage V2. Thus, whether the input voltage is 100 V or 200 V, the operations are common. Specifically, in a case in which the input voltage is 100 V, as a result of the feedback, the power conversion apparatus functions in such a way as to reduce the frequency to make more input current flow. For example, if the output is 200 W, the frequency is adjusted so that the current of 2 A flows when the input voltage is 100 V. In a case in which the input voltage is 200 V, as a result of the feedback, the power conversion apparatus functions in a direction of increasing the frequency to decrease the input current. For example, the input current is adjusted so that an equation of "200 W=200 V*1 A" is established. In this way, the reference voltage SV as the output voltage is stably obtained.

In this way, without particularly detecting the input voltage and the input current, the output voltage can be adjusted so that the voltages of both the ends of the smoothing capacitor C3 are substantially equal. Thus, as the range of the input voltage can be widened, a power conversion apparatus of universal voltage support which can be used in common to voltage circumstances of the world can be provided.

In the first or second embodiment, the phase detection section 11 connects with the rear stage of the diode bridge circuits D1~D4. The phase detection section 11 may connect with the front stage of the diode bridge circuits D1~D4 to detect a voltage phase at both ends of the alternating voltage power supply E. In short, the voltage phase of the alternating voltage power supply E may be detected.

In the fourth embodiment, the control section 13 includes the voltage averaging section 331. The voltage averaging section 331 may be arranged at the outside of the control section 13. In other words, the control section 13 may input the average voltage AV obtained by the voltage averaging section 331, and compare the input average voltage AV with the reference voltage with the comparison section 136.

In each embodiment, the switches S1 and S2 are the semiconductor switches composed of the N-type MOSFET. The switches S1 and S2 are not limited to the N-type MOSFET. The switches S1 and S2 may be composed of a P-type MOSFET. Furthermore, the switches S1 and S2 may be composed of a bipolar transistor, a SiC element, a GaN element and the like. The switches S1 and S2 are not limited to the semiconductor switches. A parallel circuit of a mechanical switch and a diode may be applied.

Other than in the operating examples, if any, or where otherwise indicated, all numbers, values and/or expressions referring to parameters, measurements, conditions, etc., used in the specification and claims are to be understood as modified in all instances by the term "about."

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A power conversion apparatus, comprising:
a power conversion circuit configured to set a point between AC input terminals of a full-wave rectifying circuit as an input terminal of an alternating voltage, connect a series circuit of a first capacitor and a second capacitor between input terminals of the alternating voltage,
connect a series circuit of a first switch and a second switch between DC output terminals of the full-wave rectifying circuit, connect one end of a series circuit of a third capacitor and an inductor with a midpoint of the first switch and the second switch, connect the other end of the series circuit of the third capacitor and the inductor with a connection point of the first capacitor and the second capacitor,
connect a positive electrode side terminal of a smoothing capacitor with a DC output terminal of a positive electrode of the full-wave rectifying circuit via a first diode for guiding a reverse current flowing through the second switch to the smoothing capacitor side and preventing a forward current flowing through the second switch from the smoothing capacitor side,
connect a negative electrode side terminal of the smoothing capacitor with a DC output terminal of a negative electrode of the full-wave rectifying circuit via a second diode for preventing counter current, and set both ends of the smoothing capacitor as output terminals of direct voltages; and
a controller configured to increase a switching frequency when an average voltage per unit time of the direct voltages output from the output terminal is larger than a reference voltage and decrease the switching frequency when the average voltage is smaller than the reference voltage to exclusively output switching signals of the switching frequencies to the first switch and the second switch.

2. The power conversion apparatus according to claim 1, wherein,
the controller comprises a reference voltage generation section which generates the reference voltage, a comparison section which compares the average voltage with the reference voltage generated by the reference voltage generation section, a frequency generator which generates a high frequency when the average voltage is larger than the reference voltage and a low frequency when the average voltage is smaller than the reference voltage according to a comparison result of the comparison section, and a pulse generator which generates the switching signal of the frequency generated by the frequency generator.

3. The power conversion apparatus according to claim 1, further comprising
a voltage detector configured to detect differential voltage between both ends of the smoothing capacitor, wherein
the average voltage is calculated according to the voltages detected by the voltage detector.

4. The power conversion apparatus according to claim 3, further comprising
a phase detector connected between the DC output terminals of the full-wave rectifying circuit and configured to detect a phase of the alternating voltage, wherein
the controller determines a phase zero point according to a phase detected by the phase detector, and calculates the average voltage according to time needed between phase zero points and the voltages detected by the voltage detector.

5. The power conversion apparatus according to claim 4, wherein
the controller comprises a phase determination section which determines the phase zero point according to the phase detected by the phase detector, a time integrating section which integrates time from a moment one phase zero point is detected to a moment the next phase zero point is detected by the phase determination section, a voltage integrating section which integrates the voltages detected by the voltage detector, and a division section which calculates the average voltage by dividing an voltage integrated by the voltage integrating section by time integrated by the time integrating section.

6. The power conversion apparatus according to claim 5, wherein
the controller comprises a reference voltage generation section which generates the reference voltage, a comparison section which compares the average voltage calculated by the division section with the reference voltage generated by the reference voltage generation section, a frequency generator which generates a high frequency when the average voltage is larger than the reference voltage and a low frequency when the average voltage is smaller than the reference voltage according to a comparison result of the comparison section, and a pulse generator which generates the switching signal of the frequency generated by the frequency generator.

7. The power conversion apparatus according to claim 1, wherein
the power conversion circuit further comprises a third diode configured to enable the current flowing to the second switch and the first diode to bypass the second switch and the first diode and a fourth diode configured to enable the current flowing to the second diode and the first switch to bypass the second diode and the first switch.

8. The power conversion apparatus according to claim 1, further comprising
a start detection section configured to detect that application of the alternating voltage is started, wherein
the controller sets the reference voltage to a high state when the application of the alternating voltage is started, and reduces the reference voltage to a predetermined reference voltage over a predetermined time.

9. The power conversion apparatus according to claim 3, further comprising
a voltage averaging section configured to calculate an average voltage per unit time of the voltages detected by the voltage detector, wherein
the controller compares the average voltage obtained by the voltage averaging section with the reference voltage.

10. The power conversion apparatus according to claim 1, wherein
the controller exclusively outputs the switching signal to the first switch and the second switch to repeat a first mode in which a current output from the DC output terminal flows through the series circuit of the third capacitor and the inductor via the second switch in a state in which the first switch is turned off and the second switch is turned on;

a second mode in which the second switch is turned off from the state of the first mode and the current flows through the closed loop formed with the series circuit of the third capacitor and the inductor, the first or the second capacitor, the first diode, the smoothing capacitor, the second diode and the first switch;

a third mode in which the first switch is turned on from the state of the second mode;

a fourth mode in which the current flowing through the closed loop reverses through the function of LC series resonance from the state of the third mode;

a fifth mode in which the first switch is turned off from the state of the fourth mode and the current flows through the closed loop formed with the series circuit of the third capacitor and the inductor, the second switch, the first diode, the smoothing capacitor, the second switch and the first or the second capacitor; and a sixth mode in which the second switch is turned on from the state of the fifth mode.

11. A power conversion method for the power conversion apparatus according to claim 1, comprising:

increasing a switching frequency when an average voltage per unit time of the direct voltages output from the output terminal is larger than a reference voltage; and decreasing the switching frequency when the average voltage is smaller than the reference voltage to exclusively output switching signals of the switching frequencies to the first switch and the second switch.

12. The method according to claim 11, wherein increasing and decreasing comprises generating the reference voltage, comparing the average voltage with the reference voltage, generating a high frequency when the average voltage is larger than the reference voltage and a low frequency when the average voltage is smaller than the reference voltage according to a comparison result, and a generating the switching signal.

13. The method according to claim 11, further comprising detecting differential voltage between both ends of the smoothing capacitor, wherein the average voltage is calculated according to the voltages detected by the voltage detector.

14. The method according to claim 13, further comprising detecting a phase of the alternating voltage; and determining a phase zero point according to a detected phase, and calculating the average voltage according to time needed between phase zero points and the voltages detected.

15. The method according to claim 14, wherein increasing and decreasing comprises determining the phase zero point according to the phase detected, integrating time from a moment one phase zero point is detected to a moment the next phase zero point is detected, integrating the voltages detected, and calculating the average voltage by dividing an voltage integrated by time integrated.

16. The method according to claim 15, wherein increasing and decreasing comprises generating the reference voltage, comparing the average voltage calculated with the reference voltage, generating a high frequency when the average voltage is larger than the reference voltage and a low frequency when the average voltage is smaller than the reference voltage according to a comparison result, and generating the switching signal of the frequency generated.

17. The method according to claim 11, wherein the power conversion circuit further comprises a third diode configured to enable the current flowing to the second switch and the first diode to bypass the second switch and the first diode and a fourth diode configured to enable the current flowing to the second diode and the first switch to bypass the second diode and the first switch.

18. The method according to claim 11, further comprising detecting that application of the alternating voltage is started, wherein setting the reference voltage to a high state when the application of the alternating voltage is started, and reducing the reference voltage to a predetermined reference voltage over a predetermined time.

19. The method according to claim 13, further comprising calculating an average voltage per unit time of the voltages detected, and comparing the average voltage with the reference voltage.

20. The method according to claim 11, further comprising exclusively outputting the switching signal to the first switch and the second switch to repeat a first mode in which a current output from the DC output terminal flows through the series circuit of the third capacitor and the inductor via the second switch in a state in which the first switch is turned off and the second switch is turned on.

* * * * *